(12) United States Patent  
Begley

(10) Patent No.: US 9,221,390 B1  
(45) Date of Patent: Dec. 29, 2015

(54) AERODYNAMIC MUDFLAP WITH LIGHTING ELEMENT

(71) Applicant: Globetech Manufacturing, Dayton, OH (US)

(72) Inventor: Timothy L. Begley, Dayton, OH (US)

(73) Assignee: Globetech Manufacturing, Dayton, OH (US)

( * ) Notice: Subject to any disclaimer, the term of this patent is extended or adjusted under 35 U.S.C. 154(b) by 0 days.

(21) Appl. No.: 14/619,548

(22) Filed: Feb. 11, 2015

(51) Int. Cl.  
*B60Q 1/26* (2006.01)  
*B62D 25/18* (2006.01)  
*B60Q 1/44* (2006.01)  
*B62D 35/02* (2006.01)  
*F21S 8/10* (2006.01)

(52) U.S. Cl.  
CPC .............. *B60Q 1/2661* (2013.01); *B60Q 1/444* (2013.01); *B62D 25/18* (2013.01); *B62D 35/02* (2013.01); *F21S 48/215* (2013.01)

(58) Field of Classification Search  
CPC ....... B62D 25/18; B62D 35/02; F21S 48/215; B60Q 1/2661; B60Q 1/444  
See application file for complete search history.

(56) References Cited

U.S. PATENT DOCUMENTS

| 5,257,822 | A | 11/1993 | Metcalf |
| 6,851,717 | B1 | 2/2005 | Andersen |
| D685,306 | S | 7/2013 | Eklund et al. |
| 2004/0080957 | A1* | 4/2004 | Golle et al. .................. 362/487 |
| 2013/0320658 | A1* | 12/2013 | Eklund et al. ................. 280/848 |

FOREIGN PATENT DOCUMENTS

EP 1291273 B1 2/2005

* cited by examiner

*Primary Examiner* — Mary Ellen Bowman  
(74) *Attorney, Agent, or Firm* — Stevens & Showalter LLP

(57) ABSTRACT

A mudflap for a vehicle includes an upper portion for attachment to the vehicle and a lower portion. The upper portion includes a generally solid panel portion and at least one lighting element provided in or on the solid panel portion. The lower portion is located underneath the upper portion in a vertical direction and includes a plurality of airflow elements defining respective flow passages for the passage of air through the mudflap during movement of the vehicle.

19 Claims, 4 Drawing Sheets

_US 9,221,390 B1_

AERODYNAMIC MUDFLAP WITH LIGHTING ELEMENT

FIELD OF THE INVENTION

The present invention relates to the field of mudflaps and, more particularly, to an aerodynamic mudflap including a lighting element.

BACKGROUND OF THE INVENTION

Mudflaps are commonly mounted behind the wheels of motor vehicles, such as trucks, trailers, cars, busses, and the like. Recent mudflaps are provided with various slits and/or other openings to allow airflow therethrough and to reduce the weight of the mudflaps, thus increasing fuel efficiency.

SUMMARY OF THE INVENTION

Aspects of the present invention relate to mudflaps having an aerodynamic design and which include one or more lighting elements for improved visibility, especially in low light conditions. Embodiments of the invention involve powering the lighting element(s) with a battery or with a vehicle power supply, such as a tail light power supply or a turn signal power supply. The mudflap may include aerodynamic airflow elements defining flow passages for the passage of air during movement of the vehicle, wherein the airflow elements may have an airfoil shape for decreasing drag and thus improving fuel efficiency.

In accordance with the first aspect of the present invention, a mudflap is provided for a vehicle. The mudflap comprises an upper portion for attachment to the vehicle and a lower portion. The upper portion includes a generally solid panel portion and at least one lighting element provided in or on the solid panel portion. The lower portion is located underneath the upper portion in a vertical direction and includes a plurality of airflow elements defining respective flow passages for the passage of air through the mudflap during movement of the vehicle.

The at least one lighting element may comprise a light emitting diode (LED), and may be powered by a battery or by a vehicle power supply. Further, the at least one lighting element may be connected to a vehicle tail light power supply and may change light intensity when brakes of the vehicle are applied. The at least one lighting element may also be constantly illuminated while the vehicle is powered on.

The solid panel portion may be at least 20 inches in area and may be adapted to receive a logo.

At least a majority of the airflow elements may have an airfoil shape. The airflow elements may be arranged at an angle of between 30° and 60° relative to vertical. The airflow elements may be oriented such that air passing through the flow passages leaves the flow passages at generally the same angle relative to horizontal as the air enters the flow passages.

The airflow elements may be arranged in a plurality of columns with generally vertical rib members separating adjacent columns.

The spacing between adjacent airflow elements may be at least 0.15 inches such that the flow passages defined between the adjacent airflow elements is correspondingly at least 0.15 inches.

The mudflap may further comprise opposed side portions located adjacent to respective side edges of the mudflap, the side portions each including at least one cutout portion for reducing a weight of the mudflap.

A thickness of the mudflap may be at least about 0.3 inches.

The upper portion may include a plurality of mounting holes for mounting the mudflap to the vehicle.

The upper portion may comprise no more than about 50% of a height of the mudflap.

In accordance with a second aspect of the present invention, a mudflap is provided for a vehicle. The mudflap comprises an upper portion for attachment to the vehicle and a lower portion. The upper portion includes a generally solid panel portion and at least one lighting element provided in or on the solid panel portion. The solid panel portion is at least 20 inches in area and is adapted to receive a logo. The lower portion is located underneath the upper portion in a vertical direction and includes a plurality of airflow elements, at least a majority of which have an airfoil shape. The airflow elements define respective flow passages for the passage of air through the mudflap during movement of the vehicle.

The at least one lighting element may be powered by a vehicle power supply, such as a vehicle tail light power supply, wherein the at least one lighting element may change light intensity when brakes of the vehicle are applied.

The airflow elements may be arranged at an angle of between 30° and 60° relative to vertical, and oriented such that air passing through the flow passages leaves the flow passages at generally the same angle relative to horizontal as the air enters the flow passages.

The spacing between adjacent airflow elements may be at least 0.15 inches such that the flow passages defined between the adjacent airflow elements is correspondingly at least 0.15 inches.

BRIEF DESCRIPTION OF THE DRAWINGS

While the specification concludes with claims particularly pointing out and distinctly claiming the present invention, it is believed that the present invention will be better understood from the following description in conjunction with the accompanying Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the invention.

Figure 1:
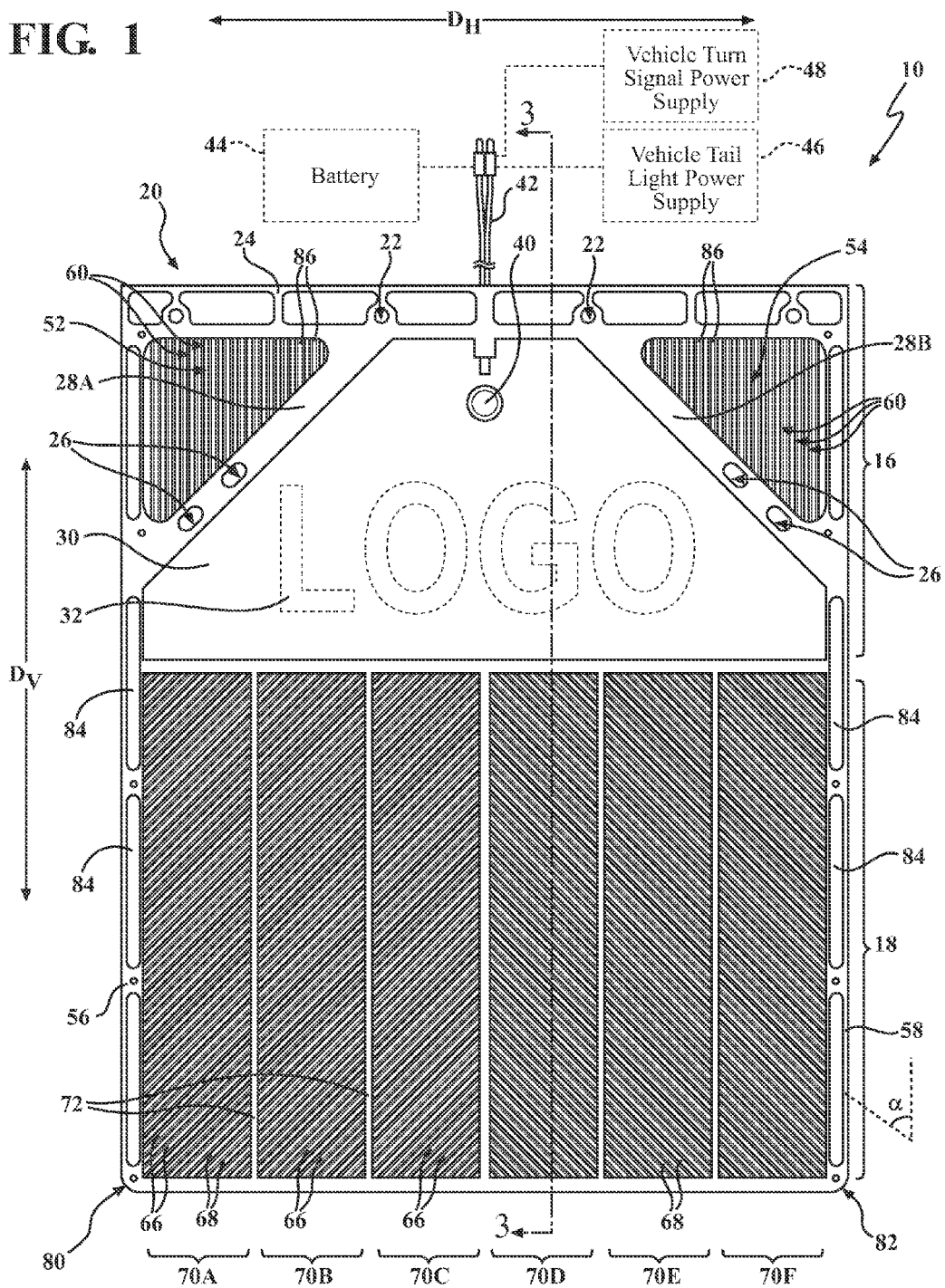
FIG. 1 illustrates a rearward facing side of a mudflap according to an aspect of the present invention, i.e., a side of the mudflap facing away from a vehicle tire.
Figure 2:
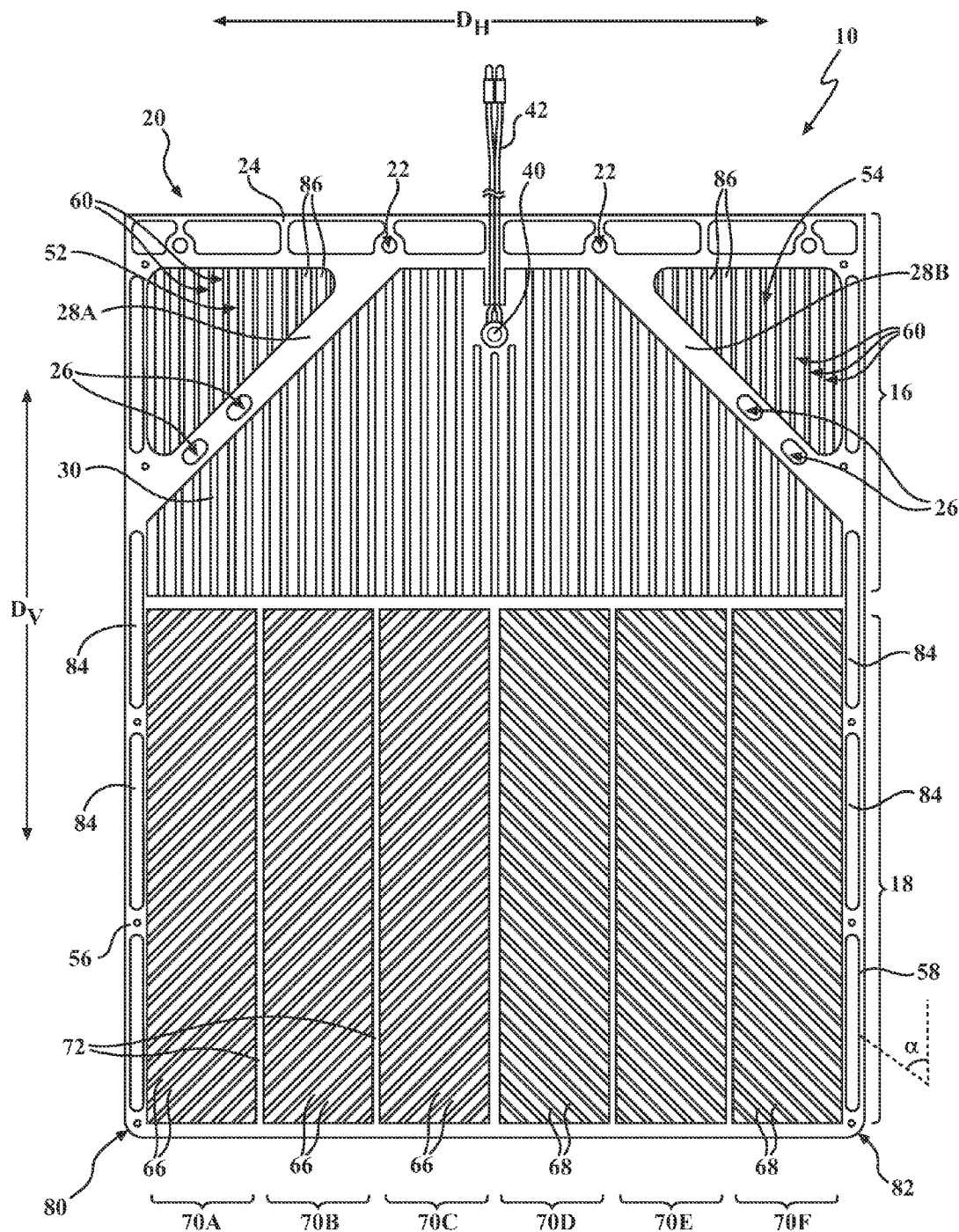
FIG. 2 illustrates a forward facing side of the mudflap of FIG. 1, i.e., a side of the mudflap facing the vehicle tire.
Figure 3:
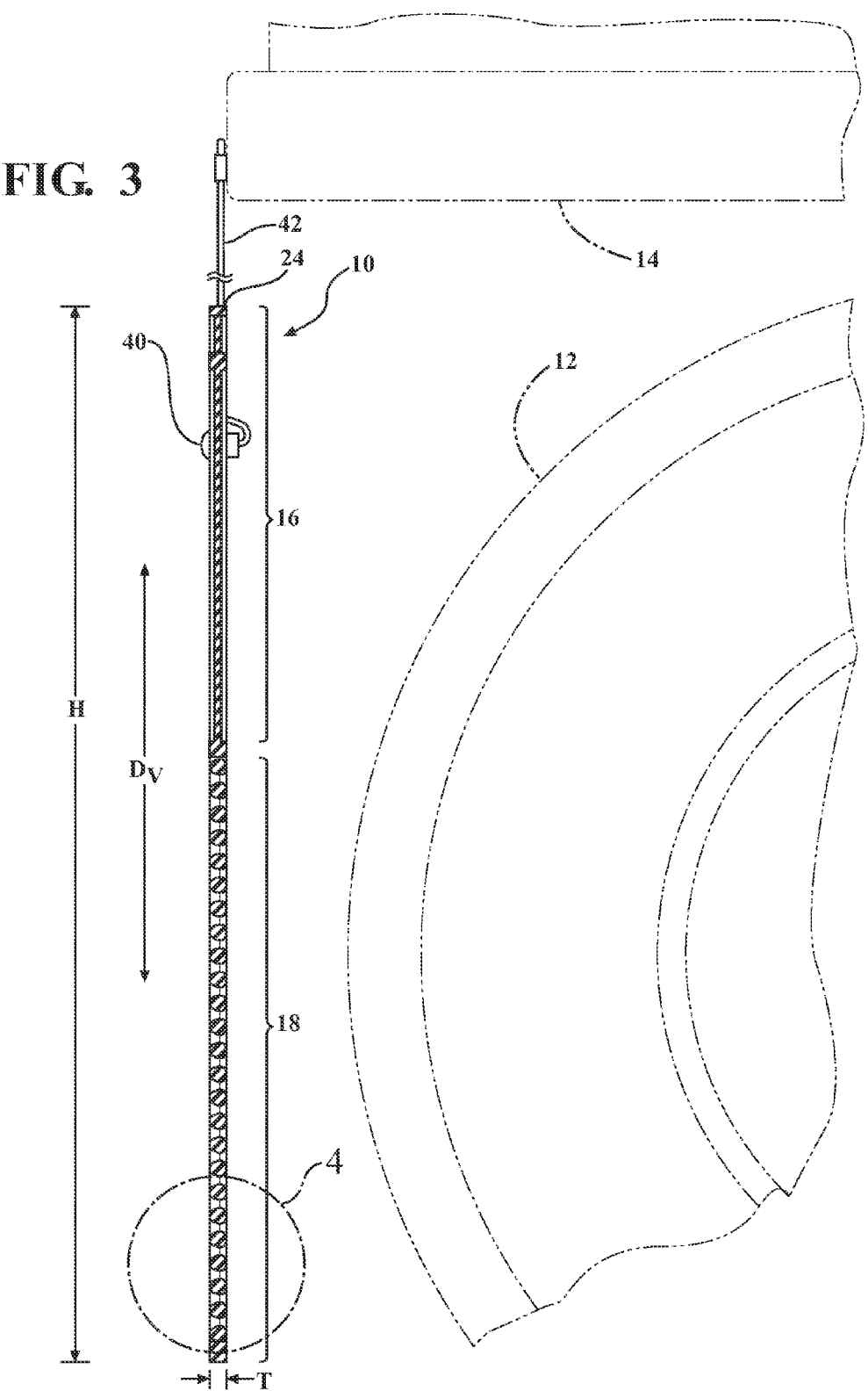
FIG. 3 is a side cross sectional view of the mudflap of FIGS. 1 and 2 taken along line 3-3 in FIG. 1.

Referring to FIGS. 1-3, a mudflap 10 for placement behind a wheel 12 of a vehicle 14 (see FIG. 3) according to aspects of the present invention is shown. As will be appreciated by those skilled in the art, the mudflap 10 could be used on a variety of vehicles 14, including, for example, trucks (semitrucks or passenger trucks), trailers, buses, motorhomes, cars, and the like. The mudflap 10 may be formed from a plastic material, such as a low-density polyethylene, to provide the mudflap 10 with a high degree of low temperature resistance and flexibility. With reference to FIG. 3, a thickness T of the mudflap 10 is at least about 0.3 inches, and more preferably, at least about 0.375 inches to provide the mudflap 10 with sufficient rigidity during movement of the vehicle 14 while not making a total weight of the mudflap 10 too heavy.

The mudflap 10 includes, generally, an upper portion 16 for attachment to the vehicle 14 and a lower portion 18 located underneath the upper portion in a vertical direction $D_V$. The upper portion 16 preferably comprises no more than about 50% of a height H of the mudflap 10, as measured in the vertical direction $D_V$, and, in a most preferable embodiment, the upper portion 16 comprises about 30-40% of the height H of the mudflap 10.

Referring to FIGS. 1 and 2, the upper portion 16 includes mounting structure 20 comprising a plurality of mounting holes 22 for mounting the mudflap 10 to the vehicle 14. While the mounting holes 22 illustrated in FIGS. 1 and 2 are aligned across a top edge 24 of the mudflap 10 in a horizontal direction $D_H$, the mounting holes 22 could be arranged in different configurations without departing from the spirit and scope of the invention. FIGS. 1 and 2 also illustrate additional mounting holes 26 provided in opposed first and second molded angles 28A, 28B that extend at respective opposite angles downwardly from the top edge 24 of the mudflap 10. These additional mounting holes 26 may be used for mounting the mudflap 10 to vehicles that include angled brackets, such as truck tractors, e.g., to clear landing gears on turns. The mounting holes 22, 26 may have reinforced edges to increase strength and to provide resistance to tearing of the surrounding mudflap material. The mounting holes 22, 26 also eliminate the need for drilling during installation, as they are positioned in customary vehicle mounting locations.

Referring still to FIGS. 1 and 2, the upper portion 16 of the mudflap 10 further includes a generally solid panel portion 30 that preferably is at least about 20 square inches (in$^2$) in area so as to allow placement of a logo 32 on the solid panel portion 20. The term "solid" as used in the phrase "solid panel portion" is meant to indicate that this portion includes no openings, or very few and/or small openings, such that the size and clarity of the logo 32 are maximized for greater visibility. The logo 32 may be applied during manufacture of the mudflap 10 or may be subsequently applied to the mudflap 10 after manufacture. While the illustrated solid panel portion 30 has a generally trapezoidal shape, the solid panel portion 30 could have any suitable shape without departing from the spirit and scope of the invention, such as, for example, a rectangular shape, an ovular shape, etc.

The upper portion 16 of the mudflap 10 further includes at least one lighting element 40 provided in or on the solid panel portion 30. In the illustrated embodiment, the at least one lighting element 40 comprises a single lighting element 40 provided toward the top of the solid panel portion 30. However, while the lighting element 40 is preferably arranged within or on the solid panel portion 30 to provide a degree of protection for the lighting element 40 from damage, the lighting element 40 could be located elsewhere on the mudflap 10, such as in the lower portion 18 of the mudflap 10.

The lighting element 40 may be, for example, a light emitting diode (LED), an incandescent light, a fluorescent light, etc., and may be powered via suitable wiring 42 that extends from the lighting element 40 to a battery 44 (see FIG. 1), or to a vehicle power supply, such as a vehicle tail light power supply 46 (see FIG. 1) or a vehicle turn signal power supply 48 (see FIG. 1). In accordance with aspects of the present invention, the lighting element 40 can be used in the following exemplary implementations: as a marker that is continuously on while the vehicle 14 is powered on; as a stop light or tail light that, when powered by the vehicle tail light power supply 44, is illuminated or changes light intensity when brakes of the vehicle 14 are applied; and/or as a turn light that, when powered by the vehicle turn signal power supply 48, is illuminated or changes light intensity when a turn signal of the vehicle 14 is applied. The lighting element 40 could be any color and offers cosmetic aesthetics and increases vehicle visibility in bad weather and during low-light conditions.

The upper portion 16 of the mudflap 10 further includes opposed first and second side airflow sections 52, 54 that are located between the molded angles 28A, 28B and respective opposed first and second side edges 56, 58 of the mudflap 10. In the embodiment shown, the side airflow sections 52, 54 are triangular-shaped but they may have any suitable shape, wherein their shape may be determined at least in part by the shape of the solid panel portion 30. For example, in the exemplary embodiment shown in FIGS. 1 and 2, the trapezoidal shape of the solid panel portion 30 leaves two triangular-shaped side airflow sections 52, 54 above and to the lateral sides of the solid panel portion 30. The side airflow sections 52, 54 each include a plurality of generally vertical elongate openings 60. The openings 60 allow air to pass therethrough during movement of the vehicle 14 to reduce drag and also to effect a reduction in the weight of the mudflap 10, wherein each of these reductions may increase fuel efficiency. It is noted that the while the openings 60 extend generally in the vertical direction $D_V$ as shown in FIGS. 1 and 2, the openings 60 could extend in any direction.

The lower portion 18 of the mudflap 10 will now be described with reference to FIGS. 1-3. In accordance with an aspect of the present invention, the lower portion 18 includes a plurality of airflow elements 66 defining respective flow passages 68 for the passage of air through the mudflap 10 during movement of the vehicle 14. In the embodiment shown, the mudflap 10 includes a plurality of six columns 70A-70F of airflow elements 66, wherein each column 70A-70F is separated from the next by a generally vertical rib member 72. It is noted that the present invention is not intended to be limited to the number of columns 70A-70F of airflow elements 66 illustrated in FIGS. 1 and 2, e.g., any number of columns of airflow elements 66 could be used.

As shown in FIGS. 1 and 2, each airflow element 66 is arranged at a dihedral angle α with respect to the two rib members 72 between which the airflow element 66 extends. The angle α may be, for example, between 30° and 60° relative to the rib members 72 and, correspondingly, relative to the vertical direction $D_V$. In the exemplary embodiment shown the angle α is about 45°. As shown in FIGS. 1 and 2, the columns 70A-70F of airflow elements 66 are arranged such that the three columns 70A-70C on the left side of the mudflap 10 are oppositely angled relative to the three columns 70D-70F on the right side of the mudflap 10 to enhance the aesthetics of the mudflap 10.

Figure 4:
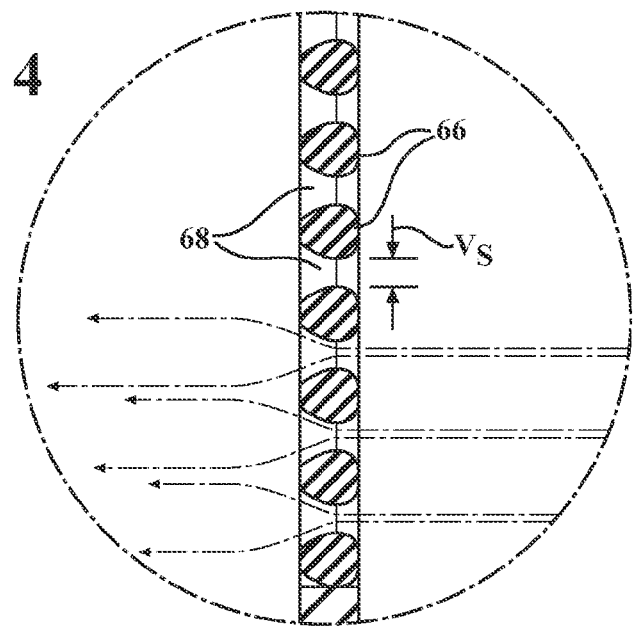
FIG. 4 is an enlarged view of portion 4 of FIG. 3.
Figure 5:
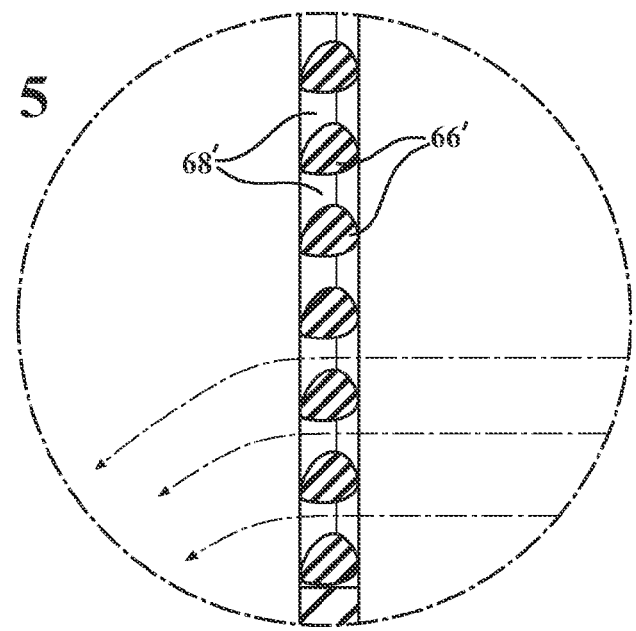
FIG. 5 is a view similar to FIG. 4 but showing a plurality of airflow elements in accordance with another aspect of the present invention, where elements similar to those of FIG. 4 include the same reference number followed by a prime (') symbol.

Referring now to FIG. 4, at least a majority of the airflow elements 66 have an airfoil shape, and, preferably, each of the airflow elements 66 has an airfoil shape. Such a shape decreases air resistance and reduces drag caused by air passing through the flow passages 68 during movement of the vehicle 14. As shown in FIG. 4, the airfoil-shaped airflow elements 66 may be oriented in a generally straight configuration, such that air passing through the flow passages 68 leaves the flow passages 68 at generally the same angle relative to the horizontal direction $D_H$ as the air enters the flow passages 68. Alternately, referring to FIG. 5, the airfoil-shaped airflow elements 66' could be oriented downwardly such that air passing through the flow passages 68' leaves the flow passages 68' at a downward angle relative to the horizontal direction $D_H$.

Referring back to FIG. 4, a vertical spacing $V_S$ between adjacent airflow elements 66 is at least 0.15 inches such that the flow passages 68 defined between vertically adjacent airflow elements 66 is correspondingly at least 0.15 inches. Such a vertical spacing $V_S$ between vertically adjacent airflow elements 66 is believed to improve the aerodynamic properties of the mudflap 10 by optimizing airflow through the flow passages 68. Such optimized airflow through the flow passages 68 may be achieved where the vertical spacing $V_S$ is at least about 0.1875 inches, for example, about 0.375 inches.

With reference once again to FIGS. 1 and 2, the mudflap 10 further includes opposed first and second side portions 80, 82 located adjacent to the first and second side edges 56, 58. More specifically, the first side portion 80 is located adjacent to the first side edge 56, and the second side portion 82 is located adjacent to the second side edge 58. The side portions 80, 82 each include at least one, and, preferably a series of cutout portions 84 for reducing the total weight of the mudflap 10. The cutout portions 84 shown in FIGS. 1 and 2 are elongated in the vertical direction $D_V$.

During operation of the vehicle 14, as the vehicle 14 travels in a forward direction air is effectively forced against the mudflap 10. The air forced against the lower portion 18 of the mudflap passes through the flow passages 68 defined between the airflow elements 66, thus reducing drag and increasing fuel efficiency. Since the airflow elements 66 according to the illustrated embodiment are airfoil-shaped and are oriented in a generally straight configuration as described above, i.e., such that the air passing through the flow passages 68 leaves the flow passages 68 at generally the same angle relative to the horizontal direction $D_H$ as the air enters the flow passages 68, air resistance and drag are minimized.

Additional air passes through the elongate openings 60 formed in the first and second side airflow sections 52, 54 and though the cutout portions 84 formed in the first and second side portions 80, 82, thus further reducing drag and increasing fuel efficiency. It is noted that the elongate openings 60 formed in the first and second side airflow sections 52, 54 may be defined by generally vertical airfoil-shaped airflow elements 86 similar to the airfoil-shaped airflow elements 66 described above.

With regard to the upper portion 16 of the mudflap 10, since the solid panel portion 30 is located in an area of the mudflap 10 that is exposed to lesser airflow than the lower portion 18, the fuel efficiency reduction caused by the solid panel portion 30 is negligible. Moreover, the solid panel portion 30 provides a convenient and highly visible location for a logo 32, which is an advantage over prior art mudflaps that include slits and/or other types of openings on their entire surface. The solid panel portion 30 also provides a degree of protection for the lighting element 40, which increases vehicle visibility in bad weather and during low-light conditions as described above.

Finally, the thickness T of the mudflap 10 is preferably at least about 0.3 inches, and more preferably, at least about 0.375 inches as noted above. Such a thickness T not only provides the mudflap 10 with sufficient rigidity to withstand deterioration during movement of the vehicle 14, but is also believed to provide the airflow elements 66 with a sufficient horizontal length, corresponding to the thickness T of the mudflap 10, for optimizing proper air flow though the passages 68. It is noted that the length of the airflow elements 66 need not directly correspond to the thickness T of the mudflap 10, i.e., the length of the airflow elements 66 may be greater than or less than the thickness T of the mudflap 10, although the length of the airflow elements 66 is preferably at least 0.150 inches and is optimally 0.375 inches.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A mudflap for a vehicle comprising:
   an upper portion for attachment to the vehicle, the upper portion including a generally solid panel portion and at least one lighting element provided in or on the solid panel portion; and
   a lower portion underneath the upper portion in a vertical direction, the lower portion including a plurality of airflow elements having an airfoil shape and defining respective flow passages for the passage of air through the mudflap during movement of the vehicle.

2. The mudflap of claim 1, wherein the at least one lighting element comprises a light emitting diode (LED).

3. The mudflap of claim 1, wherein the at least one lighting element is powered by a battery.

4. The mudflap of claim 1, wherein the at least one lighting element is powered by a vehicle power supply.

5. The mudflap of claim 4, wherein the at least one lighting element is connected to a vehicle tail light power supply and the at least one lighting element changes light intensity when brakes of the vehicle are applied.

6. The mudflap of claim 4, wherein the at least one lighting element is constantly illuminated while the vehicle is powered on.

7. The mudflap of claim 1, wherein the solid panel portion is at least 20 inches in area and is adapted to receive a logo.

8. The mudflap of claim 1, wherein the airflow elements are arranged at an angle of between 30° and 60° relative to vertical.

9. The mudflap of claim 1, wherein the airflow elements are oriented such that air passing through the flow passages leaves the flow passages at generally the same angle relative to horizontal as the air enters the flow passages.

10. The mudflap of claim 1, wherein the airflow elements are arranged in a plurality of columns with generally vertical rib members separating adjacent columns.

11. The mudflap of claim 1, wherein spacing between adjacent airflow elements is at least 0.15 inches such that the flow passages defined between the adjacent airflow elements is correspondingly at least 0.15 inches.

12. The mudflap of claim 1, wherein the mudflap further comprises opposed side portions located adjacent to respective side edges of the mudflap, the side portions each including at least one cutout portion for reducing a weight of the mudflap.

13. The mudflap of claim 1, wherein a thickness of the mudflap is at least about 0.3 inches.

14. The mudflap of claim 1, wherein the upper portion includes a plurality of mounting holes for mounting the mudflap to the vehicle.

15. The mudflap of claim 1, wherein the upper portion comprises no more than about 50% of a height of the mudflap.

16. A mudflap for a vehicle comprising:
    an upper portion for attachment to the vehicle, the upper portion including a generally solid panel portion and at least one lighting element provided in or on the solid panel portion, wherein the solid panel portion is at least 20 inches in area and is adapted to receive a logo; and a lower portion underneath the upper portion in a vertical direction, the lower portion including a plurality of airflow elements, at least a majority of which have an airfoil shape, the airflow elements defining respective flow passages for the passage of air through the mudflap during movement of the vehicle.

17. The mudflap of claim 16, wherein:

the at least one lighting element is powered by a vehicle power supply;

the at least one lighting element is connected to a vehicle tail light power supply; and the at least one lighting element changes light intensity when brakes of the vehicle are applied.

18. The mudflap of claim 16, wherein the airflow elements are:

arranged at an angle of between 30° and 60° relative to vertical; and oriented such that air passing through the flow passages leaves the flow passages at generally the same angle relative to horizontal as the air enters the flow passages.

19. The mudflap of claim 16, wherein spacing between adjacent airflow elements is at least 0.15 inches such that the flow passages defined between the adjacent airflow elements is correspondingly at least 0.15 inches.

\* \* \* \* \*